May 26, 1964  D. L. DOUGLAS ETAL  3,134,696
FUEL BATTERY
Filed Nov. 3, 1959

Inventors:
David L. Douglas,
Elton J. Cairns,
by James T. ...
Their Agent.

United States Patent Office 3,134,696
Patented May 26, 1964

3,134,696
FUEL BATTERY
David L. Douglas and Elton J. Cairns, Schenectady, N.Y., assignors to General Electric Company, a corporation of New York
Filed Nov. 3, 1959, Ser. No. 850,588
21 Claims. (Cl. 136—86)

This invention relates to gaseous fuel batteries. More particularly, this invention relates to an improved fuel cell battery comprising a plurality of gaseous fuel cells in which the electrolyte is a membrane comprising an ion exchange resin.

The presently known fuel cells are capable of producing a voltage of only slightly over 1 volt. However, because of polarization, this voltage quite often falls, even with the best of fuel cells, to a value of about 0.6 volt when a maximum power is being supplied by the cell. For many applications it would be desirable to produce voltages greatly in excess of this value but heretofore it has only been accomplished by connecting the required number of individual cells in a series arrangement, in which the negative electrode of one cell is connected to the positive terminal of another cell. One of the great advantages of some of the new, improved fuel cells has been the increased volume efficiency and the reduced amount of polarization in the cell, where the volume efficiency E is defined as the amount of electrical power which can be obtained from a unit volume of a fuel cell. When a multiplicity of fuel cells are combined in a series arrangement, the cell casing surrounding each fuel cell causes the resulting fuel battery to be quite bulky. This decreases the volume efficiency demonstrated by these fuel cells. Fuel gas and oxidant gas must also be supplied individually to each one of the cells, thereby complicating the piping and manifolding arrangement required to supply these gases from a central source.

In fuel cells of the type disclosed and claimed in the copending application of Willard T. Grubb, Serial No. 518,749, filed June 29, 1955, now U.S. 2,913,511, issued November 17, 1959, and assigned to the same assignee as the present invention, the ion exchange membrane acts not only as the electrolyte but also as a physical barrier separating the fuel and oxidant gases. If the membrane should fail as a barrier the two gases would mix and would ignite due to the catalytic activity of the electrode metal. This danger of fire is an extremely serious problem, especially if the cells are connected in any way as a battery, so that the fire in one cell can pass to a connecting cell and therefore destroy the entire battery.

An object of the present invention is to provide an improved fuel battery which is operable at room temperature and atmospheric pressure and which employs a membrane comprising an ion exchange resin as the electrolyte.

A further object of this invention is to provide a fuel battery having high volume efficiency, high power capability, and low polarization.

A further object of this invention is to provide a fuel battery which eliminates the necessity for individual cell casings and yet eliminates the fire hazard whereby a fire in one cell can pass to an adjoining cell and destroy the entire battery. This latter feature is especially desirable because of the relatively high cost of the individual cells using the noble metals as the electrode material.

A further object of this invention is to provide a method of combining at least one pair of fuel cells into a fuel battery.

These and other objects of our invention are accomplished by providing a fuel battery containing in combination at least a pair of adjoining fuel cells, means for supplying a gaseous fuel to the anode of each fuel cell, means for supplying a gaseous oxidant to the cathode of each cell, each cell comprising a hydrated ion exchange resin membrane having an anode comprising at least one gas adsorbing metal incorporated into one of the two major surfaces of the membrane and a cathode comprising at least one gas adsorbing metal incorporated into the other major surface of the membrane so that these active electrodes form an integral part of the membrane surface, and a solid electrical conductive bipolar terminal grid member forming a barrier separating the fuel gas of one cell from the oxidant gas of the other cell which is in electrical contact with and forms a gas chamber with the adjoining cell.

Our invention may be better understood by reference to the following description, taken in connection with the drawing, in which.

An ion exchange resin membrane is an outstanding electrolyte for use in the fuel cells of the fuel batteries since the electronic conduction of the membrane is negligible, electrolytic conductance of the membrane can be made high, the membranes are permeable to one kind of ion while resisting the passage of uncharged gases, the membranes are self-supporting and can be reinforced to produce membranes having high mechanical strength, and the membranes can be prepared as thin sheets of large area which is desirable for the construction of fuel batteries having favorable geometry. The batteries produced with these membranes are operable at room temperature and atmospheric pressure while having a high volume efficiency, high power capability, and low polarization. If desired, the batteries may be operated above or below ambient atmospheric conditions of temperature and pressure, within the limits of the boiling and freezing point of the aqueous medium present in the ion exchange resin membrane.

The ion exchange resin membranes employed in the present invention are ion exchange resins in sheet form. These resins include in their polymeric structure ionizable radicals, one ionic component of which is fixed into or retained by the polymeric matrix with at least one ion component being a mobile, replaceable ion electrostatically associated with the fixed component. The ability of the mobile ion to be replaced under appropriate conditions by other ions, imparts ion exchange characteristics to these materials.

As is well known, ion exchange resins can be prepared by polymerizing a mixture of ingredients, one of which contains an ionic substituent. In the case of cation exchange resins, these ionic groups are acidic groups such as the sulfonic acid group, the carboxyl group, and the like. In the case of anion exchange resins, the ionic group is basic in nature and may comprise amine groups, quaternary ammonium hydroxides, the guanidine group, the dicyandiamidine group, and other nitrogen-containing basic groups. In the case of these ion exchange resins, the ionizable group is attached to a polymeric compound such as a phenolformaldehyde resin, a polystyrene-divinylbenzene copolymer, a urea-formaldehyde resin, a melamine-formaldehyde resin, a polyalkylene-polyamine-formaldehyde resin, etc. Thus, a typical cation exchange resin may be prepared by reacting m-phenolsulfonic acid with formaldehyde. A typical anion exchange resin may be prepared by reacting a mixture of phenol, formaldehyde and triethylenetetramine. The preparation and properties of a number of different types of ion exchange resins are described throughout the literature and in particular in "Ion Exchange," Nachod, Academic Press, Inc., New York (1950); "Ion Exchange Resins," Kunin and Myers, John Wiley & Sons, Inc., New York (1950); "Styrene, Its Polymers and Copolymers and Derivatives," Boundy and Boyer, Reinhold, New York (1950); and in U.S. patents such as 2,366,007—D'Alelio; 2,366,008—D'Alelio; 2,663,702—Kropa; 2,664,397—Hutchinson; 2,678,306—Ferris; 2,658,042—Johnson; 2,681,319—Bodamer; 2,681,320—Bodamer.

The formation of these ion exchange resins into membrane or sheet form is also well known in the art. In general, these membranes are of two forms, the mosaic or heterogeneous type in which granules of ion exchange resin are incorporated into a sheet-like matrix of a suitable binder, for example, a binder of polyethylene or polyvinyl chloride, and the continuous or homogeneous ion exchange resin membrane in which the entire membrane structure has ion exchange characteristics. The latter type of membrane may be formed by molding or casting a partially polymerized ion exchange resin into sheet form. The formation of these ion exchange membranes is described, for example, in "Amberplex Ion Permeable Membranes," Rohm and Haas Co., Philadelphia (1952), and in the references mentioned in this publication. In addition, the preparation of a plurality of different types of ion exchange membranes is described in Patent 2,636,851—Juda et al. and 2,702,272—Kasper.

As a general rule, ion exchange resins are formed in aqueous solutions or emulsions of various types of organic compounds so that when the membrane is formed it is substantially saturated with water. Thus, a phenol sulfonic acid-formaldehyde resin is found to contain a plurality of reactive sites consisting of $-SO_3H$ radicals attached to the resin matrix with sufficient water being held in the resin matrix by Van der Waals force so that the $H^+$ ion is extremely mobile in the resin matrix. In this form the resin is described as being hydrated. The term "hydrated" means that the resin contains enough water to substantially saturate the resin but the resin is not necessarily wet. The amount of water in a hydrated ion exchange resin may vary within wide limits depending on the particular composition of the resin and its physical structure. Generally, the hydrated resins employed in the present invention contain from about 15 to 50 percent, by weight, of water held in the resin by secondary Van der Waals forces. This water of hydration cannot be removed from the resin by mechanical forces, but can be removed from the resinous material by subjecting the resin to a vacuum of several microns.

The thickness of the membranes employed in the practice of the present invention is not critical and may vary from several mils up to a quarter of an inch or more. However, for economic reasons and to increase the volume efficiency of the cell, the membranes are preferably as thin as possible, such as, for example, from about 2 to 30 mils. Since the membrane is a physical barrier separating the fuel gas from the oxidizing gas, in each cell of the battery, it is necessary that the membrane be free of defects and structurally strong enough to prevent the two gases from intermixing.

The ion exchange resin membrane and its two integrally bonded electrodes may be any of the types disclosed in the copending application of Leonard W. Niedrach, Serial No. 850,589, filed concurrently herewith and assigned to the same assignee as the present invention. The electrode structures comprise at least one gas adsorbing metal embedded in and integrally bonded to each of the two major surfaces of the ion exchange resin membrane. As pointed out in the Niedrach application, the maximum cell performance is obtained by the use of very active metal powders which are incorporated into and form an integral part of the two major surfaces of the ion exchange membrane. The gas adsorbing metals are preferably the noble metals of the group VIII series of metals, but may include the other metals of the group VIII series as well as silver, copper, and the transition metals, for example, manganese, vanadium, rhenium, etc., and other gas adsorbing metals disclosed in the references cited in the above-identified Niedrach application. Choice of the particular electrode metal is governed by design considerations, such as intended use, desired life of the battery, gases used for the fuel and oxidant, etc. Methods for incorporating these metal powders into the surface of the ion exchange membrane are fully disclosed in the above-identified Niedrach application. One method comprises coating glass cloth with a liquid resin having ion exchange properties, e.g., a liquid phenol sulfonic acid-formaldehyde resin, and partially polymerizing the resin to the point where the surface is still tacky. The active metal powder is sprinkled onto or otherwise distributed over each of the two major surfaces of the resin-impregnated cloth and integrally bonded thereto by subjecting the assembly to heat and preassure to complete the cure of the resin. Alternatively, the ion exchange resin may be coated with metal powder which has been premixed with a liquid or a solution of a partially polymerized resin before being distributed over the surfaces of the ion exchange resin.

When the electrode material is metal powder which has been embedded in and integrally bonded to the major surfaces of the ion exchange membrane, the resulting cells of the battery have an internal resistance which is partially due to the electrical resistance of the catalyst layer. This can be reduced by constructing each cell so that there is a sufficient number of points of contact over the electrode area with a current collecting terminal made of a good electrical conductor. These current collecting terminals were provided in the Niedrach structure by means of metal screen, metal wires, metal bars, punched or expanded metal plates, etc., in order to permit the fuel gas to contact the electrode surface on the ion exchange membrane. Preferably, these current collecting terminals referred to as a terminal grid were incorporated into the electrode structure. We have now discovered that if the terminal grids are not incorporated in the electrode structure and are made from a solid sheet of metal so formed as to produce a plurality of projections from the major surface, that a fuel cell can be produced which has many potentialities not realizable with the prior art fuel cells. The terminal grids can form the casing for each fuel cell, if desired, thereby simplifying the structure and reducing the bulk of each cell. A plurality of fuel cells may be combined into a fuel battery by merely stacking them in proper arrangement. Furthermore, a fuel battery may now be constructed in which the terminal grid between two adjoining fuel cells is only a single piece of metal having projections from both major surface areas. This construction of a fuel battery creates a considerable saving in bulk and greatly increases the volume efficiency of such a fuel battery, compared to a battery made from a plurality of individual cells constructed of identical materials. In applications of a power source such as in a space vehicle, both the savings in weight and in bulk are highly desirable. Furthermore, the use of this solid terminal grid permits a compact fuel battery to be constructed in which the individual fuel cells are internally connected in series. The terminal grid functions as a barrier so that the fuel gas may be admitted to one side of the terminal grid and the oxidant gas may be admitted to the other side, thereby making the terminal grid a bipolar terminal without the necessity for providing external electrical connections. A further advantage of this type of construction is that it permits a simplification of the required piping from a central source of fuel and oxidant gases, so that there needs to be only one source of fuel gas and one source of oxidant gas supplied to the entire battery rather than to each individual cell. One means of providing this arrangement is shown in the attached drawing.

Figures 1, 2, 3, 4, 5:
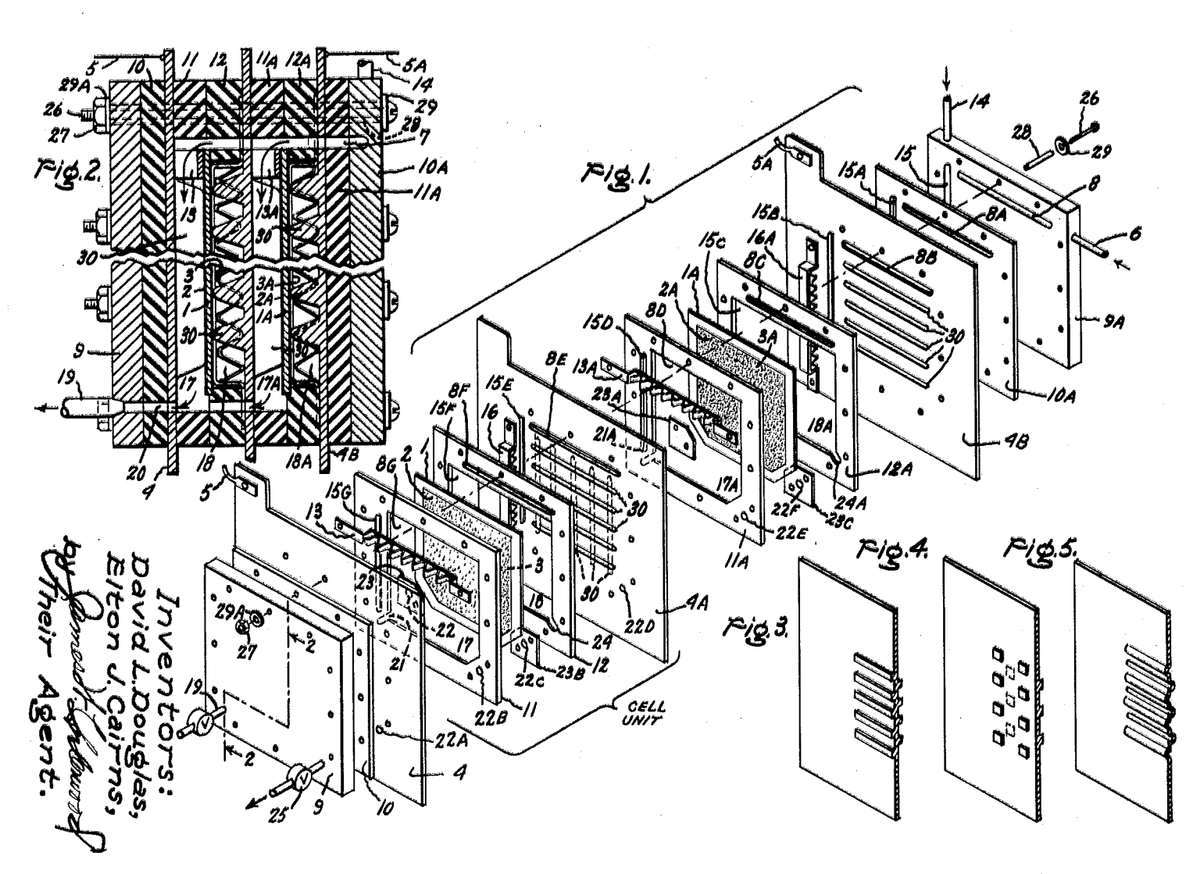
FIG. 1 is an exploded view of a fuel cell within the scope of the present invention.
FIG. 2 is an enlarged view of the battery shown in FIG. 1.
FIGS. 3, 4 and 5 show several of the alternative designs for constructing the terminal grids used in constructing the fuel battery shown in FIG. 1.

For a more complete understanding of the gaseous fuel batteries of the present invention, reference is made to the drawing in which FIG. 1 is an exploded schematic drawing of a fuel battery of the present invention, FIG. 2 is an enlarged vertical cross-sectional view of the battery of FIG. 1, along line 2—2, and FIGS. 3, 4 and 5 show several alternative constructions of the bipolar terminal grids useful in constructing our fuel cell battery. FIG. 1 illustrates a battery containing a pair of fuel cells. Additional fuel cells up to any number desired may be added to produce a battery capable of furnishing higher voltages. FIG. 1 shows the components necessary to produce additional cell units in the battery illustrated. The battery illustrated in FIG. 1 and FIG. 2 comprises ion permeable membrane 1 and 1A as the sole electrolyte having electrodes 2 and 3 and 2A and 3A respectively integrally bonded to each of their two major surfaces. Leads 5 and 5A, connected to terminal grids 4 and 4B, respectively, are used to deliver electrical current at the maximum voltage of the battery to the apparatus being operated. When the battery contains a larger number of cell units than illustrated, intermediate voltages may be supplied by connecting leads to any one or a number of the bipolar terminal grids 4A if desired. Oxidant gas is supplied to electrodes 2 and 2A through inlet 6 and the inlet manifold 7 created by coplanarly aligned slot 8 in end plate 9A, slot 8A in gasket 10A, slot 8B in terminal grid 4B, slot 8C in gasket 12A, slot 8D formed by the top edge of membrane support 13A, the top edge of membrane 1A, and top inner edge of gasket 11A, slot 8E in bipolar terminal grid 4A, slot 8F in gasket 12 and slot 8G formed by the top edge of membrane support 13, top edge of membrane 1, and top inner edge of gasket 11. Gas flowing down this manifold can flow over the face of electrodes 2 and 2A by passing through the openings provided in membrane supports 13 and 13A which hold the top edge of membrane 1 and 1A, respectively, firmly against gaskets 12 and 12A, respectively. In like manner, fuel gas is supplied to electrodes 3 and 3A through inlet 14 and the inlet manifold, not shown, formed by slot 15 in end plate 9A, slot 15A in gasket 10A, slot 15B in terminal grid 4B, slot 15C formed by the left edge of membrane support 16A, left edge of membrane 1A, and left inner edge of gasket 12A, slot 15D in gasket 11A, slot 15E in bipolar terminal grid 4A, slot 15F formed by the left edge of membrane support 16, left edge of membrane 1, and the left inner edge of gasket 12, and slot 15G in gasket 11 through the openings provided in membrane supports 16 and 16A which hold the left edge of membranes 1 and 1A, respectively, firmly against gaskets 11 and 11A, respectively. In the battery assembly, membrane 1 is held firmly between gaskets 11 and 12, membrane supports 13 and 16, and retainers 23 and 23B by terminal grid 4 and bipolar terminal grid 4A, so as to form oxidant gas chamber 17 and fuel gas chamber 18. In a like manner, membrane 1A is held firmly between gaskets 11A and 12A, membrane supports 13A and 16A, and retainers 23A and 23C by bipolar terminal grid 4A and terminal grid 4B to form oxidant gas chamber 17A and fuel gas chamber 18A. Oxidant gas chambers 17 and 17A are connected to valved outlet 19 through exhaust manifold 20 formed by colinearly aligned slots 21 and 21A in gaskets 11 and 11A, respectively, hole 22 in retainer 23, and a hole (not shown) in each lower left hand corner of bipolar terminal grid 4A, gasket 12, terminal grid 4, gasket 10 and end plate 9 which is closed with valved outlet 19. Retainer 23A is used to permit all membranes to be manufactured with a uniform shape but can be omitted entirely if membrane 1A is made with a square lower left-hand corner. Furthermore, if desired, retainer 23A may be made with a non-functional hole so that it will be identical with retainers 23, 23B and 23C. The function of retainers 23 and 23A is to hold the lower left-hand corners of membranes 1 and 1A respectively firmly against gaskets 12 and 12A respectively. The function of retainers 23B and 23C is to hold the lower right corners of membranes 1 and 1A respectively firmly against gasket 11 and 11A respectively. Exhaust manifold 20 permits impurities to be flushed from chambers 17 and 17A which may have been introduced along with the oxidant gas or any materials which may be the product of reaction of the fuel gas. In a like manner, impurities in the fuel gas or any materials which may be the products of reaction of the fuel gas and oxidant gas may be flushed from fuel gas chambers 18 and 18A by means of the exhaust manifold formed by colinearly aligned slots 24 and 24A in gaskets 12 and 12A, respectively, holes 22A, 22B, 22C, 22D, 22E, 22F and holes (not shown) in the lower right-hand corner of gasket 10 and end plate 9 closed by valved outlet 25. The entire assembly is held together with a plurality of bolts 26 and nuts 27 which are electrically insulated from all metallic parts of the battery by insulating sleeves 28 and insulating washers 29 and 29A. Insulating washers 29 and 29A are required only when end plates 10 and 10A are fabricated of an electrically conductive material. As will be readily apparent, the gas inlets and outlets in end plates 10 and 10A may be fabricated directly onto terminal grids 4 and 4B thereby eliminating not only end plates 10 and 10B, but also gaskets 11 and 11A. It is to be noted in FIG. 1 and FIG. 2 that terminal grids 4 and 4B and bipolar terminal grid 4A have been illustrated as being of a larger area than the other components. This structure provides cooling fins to permit easy removal of any heat generated in the battery. Alternatively, the terminal grids may be made the same size as the other components, if no cooling fins are desired.

FIG. 1 has illustrated a battery containing two cells. It will be obvious to those skilled in the art that, by use of the same elements illustrated in FIG. 1, a battery having three or more cells may be constructed by including the desired number of additional cell units. In FIG. 1, a cell unit comprises membrane supports 13 and 16, gaskets 11 and 12, membrane 1 having electrodes 2 and 3 integrally bonded to each of its major surfaces, retainers 23 and 23B, and bipolar terminal grid 4A.

Terminal grids 4 and 4B need to have projections 30 (FIG. 2) from only that major surface required to contact electrode 2 on membrane 1 and electrode 3A on membrane 1A, respectively. Since bipolar terminal grid 4A must contact electrodes on two different membranes illustrated in FIGS. 1 and 2 as electrode 3 on membrane 1 and electrode 2A on membrane 1A, it must have projections 30 on both of its major surfaces. The particular shape or pattern of these projections on any of the terminal grids is not critical, since their primary function is to make good electrical contact with the respective electrodes to aid in reducing the internal resistance of the cell. Since the projections are rigid and are the means by which the terminal grids on each side of the membrane make direct contact with the electrode surface, these projections also serve as supports to resist buckling of the membrane which could be caused, for example, by unequal pressure of the fuel and oxidant gas. The projections may be formed on the terminal grids by any suitable means, for example, by machining or die forming the entire grid with projections from a solid shape of metal, by casting the entire grid structure in a mold, by soldering, welding, bolting or otherwise fastening the shaped projections onto a sheet of metal, by using any of the above methods to form projections on one side of a metal sheet which is subsequently soldered, welded or otherwise united back-to-back to another shaped sheet, etc. Nominally we desire that the grid structure be as thin as possible consistent with good design practice for the structural strength required. They may be made of any electrically conductive material, including graphite, conductive carbon, conductive plastics, metallized plastics, metallized ceramics, etc., as well as metals. If any of the materials used are not resistant to the corrosive conditions of the cell, they can be suitably protected, by an electrically conductive protective coating, for example, by electroplating with a metal capable of resisting the corrosive attack, for example, a noble metal of which gold, palladium, platinum are examples.

Where water is the product of the cell reaction, for example, when hydrogen and oxygen are used as the fuel and oxidant gas, respectively, these projections should preferably form a pattern which aids in permitting the water to drain off the particular membrane surface from which it is expelled. FIGS. 3, 4 and 5 illustrate a few of the many varieties of alternative designs which may be used in forming bipolar terminal grid 4A. The same or different designs may be used on one major surface only in forming terminal grids 4 and 4B.

As indicated previously, end plates 9 and 9A may, if desired, be omitted. However, when it is desirable to use them, they can be made of any material which has structural strength and can resist corrosion conditions encountered in the cell. They may be, for example, made of metal, but are preferably made of an insulating material such as polystyrene, polymethyl-methacrylate, fibrous- or fabric-based phenolic, urea, or melamine laminates, hard rubber, etc. When such insulating materials are used, insulating washers 29 and 29A may be omitted.

Gaskets 10, 10A, 11, 11A, 12, 12A may be made of any resilient rubbery type of polymer, but preferably one which is not affected by the feed gases or their reaction products with which they come in contact. Suitable materials would be, for example, the synthetic rubber elastomers such as silicone rubber, rubbery, copolymers of fluorinated ethylene, synthetic rubbery copolymers of butadiene with styrene, acrylonitrile, isoprene, butene, chloroprene, or the homopolymers of chloroprene, etc. The insulating sleeves 45 and insulating washers 43 and 44 may be fabricated from any of the known insulators, such as those used for making the end plates 10 and 10A, or can be for example, vulcanized fiber. Membranes 1 and 1A may be fabricated with an electrically insulating fabric reinforcement which can be any material resistant to the chemical conditions existing in the membrane, for example, Orlon cloth, nylon cloth, glass cloth, fibrous mats of Orlon, nylon, glass, etc. Such materials serve to strengthen the membranes 1 and 1A and can also aid in fabrication of the membrane. We have found that the incorporation of metal wires in the form of screen wire mats, etc. into the electrode layer is not necessary, although it may be done if desired. Electrodes 2, 2A, 3 and 3A form the major surfaces of the ion exchange membranes 1 and 1A. Each membrane structure with its two electrode surfaces is united into a unitary mass. Terminal grids 4 and 4B and bipolar terminal grid 4A are fabricated from solid sheets of metal and therefore serve as physical barriers to prevent commingling of the fuel and oxidant gases, for example, between fuel gas chamber 18 and oxident gas chamber 17. Furthermore, if, for example, membrane 1 developed a physical defect, for example, a pinhole leak permitting fuel gas from chamber 18 to commingle with oxidant gas in chamber 17 in the presence of the catalytic reactive electrodes 2 and 3, considerable heat would be generated which might cause further failure of membrane 1, finally resulting in the development of sufficient heat that a fire might result. In this case, terminal grid 4 and bipolar terminal grid 4A serve as a fire wall to confine any fire or generation of intense heat to a single cell without permitting it to spread to other cells within the battery. To minimize and to aid in early detection of such malfunctioning of a particular cell, we may incorporate within each gas chamber a thermocouple which actuates a solenoid valve in the gas supply lines to interrupt the flow of gas to the battery when any cell reaches a predetermined maximum temperature.

In the battery of FIGS. 1 and 2, where the membranes 1 and 1A are cation permeable membranes having $H^+$ ions as the mobile ion, where the fuel gas is hydrogen and the oxidant gas is air, the overall cell reaction for the battery is the oxidation of hydrogen to water. The respective reactions at the anodes 3 and 3A and cathodes 2 and 2A are as follows:

(1) $H_2 = 2H^+ + 2e$
(2) $\frac{1}{2}O_2 + 2H^+ + 2e = H_2O$

Where hydrogen is used as a fuel gas it is noted that the product of the overall cell reaction is water. It is not known whether this water forms at the oxygen electrode or in the cation permeable membrane. However, since the membrane is substantially saturated with water prior to the operation of the cell, the product water is rejected at the oxygen electrode on the membrane from which it escapes by simple flow or by evaporation. However, means may be provided, if desired, for collecting the water as it is formed and carrying it away from the cell. Thus, the water formed may be allowed to flow from the membrane into a collection trough or the membrane may be subjected to a current of air or other gas to sweep the water away from the membrane as it is formed. Where the oxidant employed in the cell is air, the nitrogen of the air does not enter into the cell reaction and begins to accumulate in chambers 12 and 12A. For this reason it is desirable to bleed off a portion of the gases from chambers 12 and 12A through valved outlet 20 so as to maintain the concentration of oxygen in chamber 12 and 12A at a level somewhat near the level found in air, i.e., about 20 percent by volume.

When the cell just described employs an anion permeable resin membrane with hydrogen and oxygen, the overall reaction is again the oxidation of hydrogen to water with the electrode reactions being:

(3) $H_2 + 2OH^- = 2H_2O + 2e$
(4) $\frac{1}{2}O_2 + H_2O + 2e = 2OH^-$

In this case the water accumulates at the hyrogen electrode from which it can be removed by means similar to those for removing water from the oxidant chamber.

Where the fuel gas is a hydrocarbon such as methane, the battery of FIGS. 1 and 2 may contain either anion permeable membranes or cation permeable membranes as the electrolyte. Where oxygen is employed as the oxidant, the overall cell reaction is the oxidation of the methane to carbon dioxide and water. The carbon dioxide, which accumulates in chambers 18 and 18A, may be withdrawn through valved outlet 25. The water formed in the reaction may be removed by methods previously described. The respective anode and cathode reactions of this cell for a cation exchange resin membrane are as follows:

(5) $CH_4 + 2H_2O = CO_2 + 8H^+ + 8e$
(6) $2O_2 + 8H^+ + 8e = 4H_2O$

Where the membrane 1 employed is an anion exchange resin, somewhat different anode and cathode reactions are found, but the products of reaction can be removed by the methods previously described. These reactions are listed below:

(7) $CH_4 + 8OH^- = CO_2 + 6H_2O + 8e$
(8) $2O_2 + 4H_2O + 8e = 8OH^-$

Where carbon monoxide is the fuel gas and oxygen is the oxidant, a battery may be constructed corresponding to FIGS. 1 and 2 with either an anion or cation exchange resin membrane as the electrolyte. The overall cell reaction is the oxidation of carbon monoxide to carbon dioxide with the formation of water. It is desirable to remove the carbon dioxide as it is formed by bleeding a portion of the gas from chambers 18 and 18A through valved outlet 25. The water formed can be removed by previously described methods. In the cell just described the anode and cathode reactions are as follows.

Anion exchange resin membrane:

(9) $CO + 2OH^- = CO_2 + H_2O + 2e$
(10) $\frac{1}{2}O_2 + H_2O + 2e = 2OH^-$

Cation exchange resin membrane:

(11) $CO + H_2O \rightarrow CO_2 + 2H^+ + 2e$
(12) $\frac{1}{2}O_2 + 2H^+ + 2e \rightarrow H_2O$ In the above cell reactions where carbon dioxide is the product and the membrane is an anion exchange resin in the hydroxide form, it is to be expected that the carbon dioxide product will convert the anion exchange resin to the carbonate form which will tend to increase the internal resistance of the cell.

The following examples are illustrative of the practice of our invention and are not for purposes of limitation.

PREPARATION OF COMBINATION ELECTRODE AND MEMBRANE

A partially polymerized ion exchange resin prepared as follows: 100 grams of phenol were reacted with 108 grams of 95% sulfuric acid for 3 hours at a temperature of 130° C. After cooling to 50° C., this solution of phenol sulfonic acid was added with cooling and stirring to 130 grams of 37% by weight aqueous formaldehyde at such a rate that the temperature did not exceed 15° C. This liquid ion exchange resin was stored at 0–5° C. until used to prepare the membranes.

Membranes for the fuel battery were prepared as follows. Orlon cloth after being cut to the desired size of the ion exchange resin membrane was thoroughly impregnated with the above prepared liquid ion exchange resin. The impregnated cloth was laid between two sheets of polyvinylidene chloride. This sandwich was placed between two press platens using shims around the sandwich to produce a membrane of about 25 mils thickness. The entire assembly was placed in a press and subjected to a pressure of 200–250 pounds per square inch at a temperature of 100–105° C. for 2 minutes and immediately quenched in cold water to produce a partially cured ion exchange resin membrane reinforced with the Orlon cloth from which the polyvinylidene chloride sheeting was easily stripped. The smooth tacky surface of the ion exchange resin membrane was roughened by scraping the surface with a razor blade. The desired metal powder was evenly spread over the major surfaces of the membrane from a sieve from which it was sifted onto the two major surfaces. After the first surface was coated, it was covered with a press platen and inverted and the second surface similarly coated and covered with another press platen. The metal powder was integrally bonded to the surface of the ion exchange resin by subjecting the above assembly to a pressure of 200–250 pounds per square inch in a hydraulic press for 30 to 50 minutes while heating to 100 to 105° C. to complete the cure of the ion exchange resin. After removal from the press and cooling, the combination of the ion exchange resin membrane having the two metal electrodes integrally bonded to the two major surfaces was readily stripped from the press platens and was ready for trimming the edges and assembly into the battery illustrated in FIG. 1.

In the same manner that an ion exchange resin membrane can be made using a phenol sulfonic acid formaldehyde resin which is a cation exchange resin membrane, an anion exchange resin membrane can be used in constructing the membrane of a fuel cell for use in our fuel battery. For example, the anion exchange resin membrane can be made as follows.

Beads of a 95% styrene, 5% divinyl benzene copolymer are chloromethylated with chloromethyl ether. This chloromethylated product is aminated with trimethyl amine to form the corresponding quaternary ammonium chloride. This resin is reacted with aqueous potassium hydroxide to form a hydrated anion exchange resin in which the mobile ions are hydroxide ions. Two parts by weight of this resin in powdered form are intimately mixed with 1 part by weight of polyethylene and the resulting mixture is molded into sheet form to give the anion exchange resin membrane. In the hydrated form this membrane contains about 35% water and contains about one milliequivalent of hydroxide ions per gram of membrane.

The metal electrodes can be integrally bonded to the surface of this membrane by spreading the metal powder on each surface and subjecting the coated membrane to sufficient heat, e.g., 110° C. with or without pressure to cause the metal powder to be embedded in the surface of the membrane due to the thermoplastic nature of the polyethylene.

*Example 1*

A battery containing two fuel cells in series was constructed as illustrated in FIG. 1, end plates 9 and 9A were made from polymethylmethacrylate sheet material, gaskets 10 and 10A were fabricated from silicone rubber sheet material, gaskets 11, 11A, 12 and 12A were fabricated from neoprene rubber sheet material, membrane supports 13, 13A, 16 and 16A and retainers 23, 23A, 23B, and 23C were fabricated of titanium metal. Terminal grids 4 and 4B and bipolar terminal grid 4A were fabricated of copper sheet with the central area of each which would be common to gas chambers 17, 17A, 18 and 18A being gold plated to a thickness of 2 to 3 mils after projections 30 were formed in the surface by die stamping. In order to facilitate fabrication of bipolar terminal grid 4A, it was formed of two sheets of copper in which the projections for each side were formed and then the two sheets were soldered back-to-back with the projections on the outer surfaces. The height of these projections was made the same as the thickness of the gaskets when compressed with which they cooperate to form the oxidant and fuel gas chambers, in order that they would make direct contact with the electrode areas on the ion exchange resin membrane. These projections or ribs should be sufficient to allow the fuel and oxidant gases to flow easily over the electrode surfaces. We prefer that the projections be at least 0.1 inch in height. Ion exchange resin membranes 1 and 1A were fabricated as described above. In the case of membrane 1, palladium black having a surface area of approximately 12 to 15 square meters per gram was used as described above to form electrodes 2 and 3 in an amount sufficient to give a metal concentration of 0.025 gram per square inch over the effective electrode areas. Electrode areas 2A and 3A on membrane 1A were formed of platinum black having a surface area of approximately 35 square meters per gram and was used in an amount sufficient to give a concentration of 0.050 gram per square inch over the entire effective electrode area. The effective electrode area on each membrane was that major area of each membrane which is not in contact with the gaskets in the assembled battery. The dimensions of the various components making up this battery are not critical. However, to give some idea of the size of this battery the overall dimensions of the end plates and gaskets is 8 inches by 8 inches, and the membranes are 7 inches by 7 inches, with the effective area on each of the major surfaces being 6 inches by 6 inches. The terminal grids had an overall dimension of 12 inches by 12 inches, not including the tab for making electrical connections.

Performance data on each cell as well as for the entire battery, using hydrogen as the fuel and oxygen as the oxidant, are shown in Table I.

TABLE I

| Battery | Volts | | Milliamps/cm.² |
|---|---|---|---|
| | Cell #1 | Cell #2 | |
| 2.011 | 0.970 | 1.041 | 0.0 |
| 1.978 | 0.950 | 1.028 | 0.084 |
| 1.954 | 0.937 | 1.017 | 0.165 |
| 1.908 | 0.915 | 0.993 | 0.390 |
| 1.852 | 0.890 | 0.962 | 0.948 |
| 1.798 | 0.865 | 0.933 | 1.725 |
| 1.726 | 0.839 | 0.897 | 2.89 |
| 1.665 | 0.809 | 0.856 | 4.31 |
| 1.509 | 0.741 | 0.768 | 8.62 |
| 1.357 | 0.676 | 0.681 | 12.94 |
| 1.205 | 0.609 | 0.596 | 17.46 |
| 0.922 | 0.474 | 0.448 | 25.08 |
| 0.452 | 0.250 | 0.202 | 37.08 |
| 0.266 | 0.245 | 0.021 | 41.40 |

*Example 2*

A battery was constructed similar to that in Example 1 except the battery contained an additional two cell units designated in FIG. 1, so that the battery had 4 cells in series. The membranes of cells 1 and 3 had integrally bonded electrodes fabricated of palladium black in an amount sufficient to give a concentration of 0.025 gram per square inch of effective electrode area. Cell 2 had a membrane of integrally bonded electrodes of platinum black using an amount sufficient to contain 0.050 gram per square inch of effective electrode area. Cell 4 was an ion exchange resin membrane having integrally bonded electrodes made of a mixture of palladium and platinum black using an amount sufficient to provide a concentration of 0.025 gram per square inch of effective electrode area of each palladium and platinum metal. Performance data on each cell as well as the entire battery containing these cells, using hydrogen as the fuel and oxygen as the oxidant, are shown in Table II.

TABLE II

| Battery | Volts | | | | Milliamps/cm.² |
|---|---|---|---|---|---|
| | Cell #1 | Cell #2 | Cell #3 | Cell #4 | |
| 3.931 | 0.94 | 1.02 | 0.967 | 1.004 | 0 |
| 3.829 | 0.91 | 0.99 | 0.939 | 0.990 | 0.0405 |
| 3.764 | 0.90 | 0.96 | 0.927 | 0.977 | 0.0793 |
| 3.721 | 0.896 | 0.95 | 0.913 | 0.962 | 0.159 |
| 3.575 | 0.862 | 0.90 | 0.883 | 0.930 | 0.496 |
| 3.546 | 0.855 | 0.90 | 0.873 | 0.918 | 0.728 |
| 3.427 | 0.830 | 0.86 | 0.847 | 0.890 | 1.424 |
| 3.295 | 0.796 | 0.825 | 0.818 | 0.856 | 2.59 |
| 3.046 | 0.729 | 0.749 | 0.767 | 0.801 | 5.22 |
| 2.489 | 0.646 | 0.40 | 0.703 | 0.740 | 8.62 |
| 2.073 | 0.53 | 0.25 | 0.622 | 0.671 | 12.95 |
| 1.635 | 0.395 | 0.13 | 0.520 | 0.590 | 17.3 |
| 1.113 | 0.23 | — | 0.454 | 0.429 | 22.8 |
| 0.708 | 0.095 | — | 0.304 | 0.309 | 30.6 |
| 0.315 | — | — | 0.03 | 0.285 | 47.6 |

—Indicates that this cell was cut out of the circuit for this reading.

*Example 3*

A battery was made up similar to Example 2 containing 4 cells in series. The phenol sulfonic acid resin was prepared as previously described, except for cell 4, in which the ratio of formaldehyde to phenol was increased from 1.4 mols of formaldehyde to 1 of phenol to 1.5 mols of formaldehyde to 1 of phenol. The composition of the electrode areas integrally bonded to these membranes for each of these cells were as follows: Cell 1 and cell 2 were palladium black in a concentration of 0.025 gram per square inch. Cell 3 was a mixture of palladium black and platinum black in an amount sufficient to give a concentration of 0.025 gram per square inch of each metal. Cell 4 was palladium black in an amount sufficient to give a concentration of 0.050 gram per square inch of effective electrode area. The performance data of this battery using hydrogen as the fuel and oxygen as the oxidant are shown in Table III.

TABLE III

| Battery | Volts | | | | Milliamps/cm.² |
|---|---|---|---|---|---|
| | Cell #1 | Cell #2 | Cell #3 | Cell #4 | |
| 3.85 | 0.936 | 0.942 | 0.997 | 0.964 | 0.00 |
| 3.70 | 0.897 | 0.904 | 0.963 | 0.942 | 0.0334 |
| 3.55 | 0.856 | 0.865 | 0.924 | 0.907 | 0.224 |
| 3.44 | 0.830 | 0.840 | 0.898 | 0.872 | 0.543 |
| 3.08 | 0.752 | 0.776 | 0.801 | 0.752 | 2.93 |
| 2.984 | 0.693 | 0.732 | 0.767 | 0.787 | 5.17 |
| 2.411 | 0.508 | 0.590 | 0.608 | 0.705 | 10.61 |
| 2.193 | 0.441 | 0.585 | 0.504 | 0.663 | 13.4 |
| 1.767 | 0.310 | 0.502 | 0.362 | 0.593 | 17.4 |
| 1.279 | 0.108 | 0.432 | 0.215 | 0.524 | 24.2 |

*Example 4*

A battery containing 4 cells in series was constructed as in Example 2 in which the ion exchange resin membrane for each cell was fabricated from a phenol sulfonic acid formaldehyde ion exchange resin as previously described except for cells 3 and 4, in which the molar ratio of the formaldehyde to phenol sulfonic acid increased to 1.5 mols of formaldehyde to 1 mol of phenol sulfonic acid. The composition of the electrode areas integrally bonded to each of these membranes were as follows: cell 1 was palladium black using an amount sufficient to provide a concentration of 0.025 gram per square inch. Cell 2 was a mixture of palladium and platinum black each in an amount sufficient to provide 0.025 gram per square inch. Cell 3 was platinum black in an amount sufficient to give a concentration of 0.050 gram per square inch. Cell 4 was palladium black in an amount sufficient to give a concentration of 0.050 gram per square inch. The performance data of this battery using hydrogen as the fuel and oxygen as the oxidant are shown in Table IV.

TABLE IV

| Battery | Volts | | | | Milliamps/cm.² |
|---|---|---|---|---|---|
| | Cell #1 | Cell #2 | Cell #3 | Cell #4 | |
| 3.972 | 0.943 | 1.001 | 1.048 | 0.930 | 0 |
| 3.712 | 0.875 | 0.929 | 0.986 | 0.922 | 0.216 |
| 3.637 | 0.855 | 0.913 | 0.965 | 0.904 | 0.439 |
| 3.559 | 0.836 | 0.896 | 0.944 | 0.883 | 0.862 |
| 3.429 | 0.798 | 0.864 | 0.915 | 0.852 | 1.725 |
| 3.251 | 0.741 | 0.818 | 0.880 | 0.812 | 3.06 |
| 3.096 | 0.711 | 0.755 | 0.835 | 0.795 | 5.22 |
| 2.765 | 0.605 | 0.639 | 0.773 | 0.748 | 8.62 |
| 2.290 | 0.460 | 0.447 | 0.696 | 0.687 | 12.94 |
| 1.797 | 0.320 | 0.251 | 0.626 | 0.600 | 17.3 |
| 1.429 | 0.300 | 0.145 | 0.574 | 0.405 | 22.3 |
| 1.41 | 0.270 | 0.24 | 0.560 | 0.340 | 26.8 |

*Example 5*

Fine wire mesh screen fabricated of platinum or palladium wire on which palladium or platinum black has been deposited can be substituted in place of the palladium and platinum blacks illustrated in Examples 1–4. If the mesh is 150 or finer, and especially if the wires are flattened, the platinizing or palladinizing step will deposit metal particles which will bridge the interstices of the screen. When this screen is used to prepare the integrally bonded electrode areas on the membrane, it is found that the cells of the battery operate almost as efficiently as though the electrodes were made directly from palladium or platinum black.

*Example 6*

The anion exchange resin membrane described above may be used with its integrally bonded electrodes in our fuel battery in place of the cation exchange resin of Examples 1–5. In general, anion exchange resin membranes tend to have a lower electrolytic conductivity than cation exchange resins which increases the internal resistance of the battery. However, the lessened corrosion experienced with the use of anion exchange resin membranes as the electrolyte, makes anion exchange resin membranes more desirable for many applications.

*Example 7*

When pure hydrogen and oxygen are used as the gases there is no need to vent the gases from the battery. When air is used as the oxidant, the battery will operate for a short time without venting but as the concentration of nitrogen increases the battery decreases in performance. However, if the oxidant chambers are vented so that a continual flow of air is maintained, the battery performs as well on air as it does on oxygen. Likewise, when the hydrogen is replaced with other gaseous fuels, e.g., natural gas (mostly methane), ethylene, ethane, propane, carbon monoxide, etc., the combustion product, e.g., carbon dioxide, accumulates in the fuel gas chamber from which it must be removed. On venting these gases from the fuel chamber of the battery through barium hydroxide, a precipitate of barium carbonate forms.

*Example 8*

Electrodes may be coated on ion exchange resin membranes by electrostatic techniques. A partially polymerized phenol sulfonic acid-formaldehyde resin membrane having a tacky surface prepared as described above for the general method for making of membranes, was placed on the under side of the top plate and palladium black was spread on the top surface of the lower plate of a pair of parallel metal plates spaced approximately ¾ inch apart. An alternating current at a potential of 28,000 volts regulated by a rotating gap to vary the wave form of the alternating current was applied to the pair of metal plates. This caused the palladium metal particles to vibrate between the plates with some of the particles becoming embedded in the tacky surface of the membrane forming a very uniform metal coating on the one surface. By inverting the membrane on the plate, the other side of the membrane was coated in a similar manner. The coated membrane was subjected to a temperature of 100–105° C. at a pressure of 200–250 pounds per square inch for 30 minutes to fully cure the ion exchange resin and to integrally bond the palladium electrodes to the surface of the membrane. After trimming, the membrane is ready to use in the fuel battery described in Example 1.

Other modifications of this invention and variations of the structure may be employed without departing from the scope of the invention; for example, the shape of the battery may be varied and may conveniently be chosen to fit into an existing space. Normally, when hydrogen and oxygen are used as the fuel and oxidant gases, respectively, the by-product water is usually exhausted to waste. Any means for automatically controlling the level of the water at a predetermined level in the cells of the battery may be used and the reservoir for water may be conveniently equipped with a condenser to prevent loss of water. Furthermore, it may be desirable to run the fuel battery both as a primary source of power as well as a means of storing radiant energy by first converting it to a source of power which is used to electrolyze water in the battery to produce hydrogen and oxygen which is used to produce electricity at a later time. Also, it is possible in a single cell to make the membrane separating the fuel and oxidant gas from a plastic insulating sheet, e.g., polyethylene, polystyrene, etc., having a plurality of ion exchange membranes as isolated areas making individual cells which can be conveniently connected by wires within the insulating resin structure itself in either a series or parallel arrangement or both, so that the sheet structure would be a battery. Where a fuel battery is desired to produce electricity unfailingly for a long period of time without attention, it would be possible to build a fuel battery wherein the fuel and oxidant gases are supplied from two relatively large volumes of gas, either at the pressure at which they are to be used in the battery or as compressed gases with suitable pressure reducing valves. Using hydrogen and oxygen for an example, two volumes of hydrogen are required for every volume of oxygen if the pressure and temperature of each gas are equal. In this case, the gas space for the hydrogen would be twice as large as the volume provided for with oxygen. In this way, an equal pressure would be maintained on each side of the membranes from the beginning and the life of the fuel battery would be only determined by the amount of gases supplied. Means could also be provided whereby the water produced could be used to generate oxygen from an oxygen producing compound such as calcium superoxide, and hydrogen from a hydrogen producing compound, for example a metallic hydride of which calcium hydride is an example, or an extremely reactive metal such as sodium. Various generators could be used, for example, designed after a Kipp generator, so that at a given predetermined pressure, the water would be removed from contact with the gas generating chemicals. Alternatively, pressure actuated or float valves could be used to regulate the flow of generating fluid, for example, as disclosed and claimed in an application of Liebhafsky and Niedrach, Serial No. 29,032, filed May 13, 1960, and assigned to the same assignee as the present invention.

The fuel batteries of this invention may be used for any application where a reliable source of direct current electric power is required, to activate motors, instruments, such as radio transmitters, lights, heaters, etc. The power of the fuel battery can be used as the source of the low voltage direct current required for a thermoelectric refrigerator.

These and other modifications of this invention which will readily be discernible to those skilled in the art, may be employed within the scope of the invention. The invention is intended to include all such modifications and variations as may be embraced within the following claims.

What we claim as new and desire to secure by Letters Patent of the United States is:

1. A gaseous fuel battery containing in combination at least a pair of adjoining fuel cells, each of said cells comprising a hydrated, ion exchange resin membrane, said membrane having an anode comprising at least one gas adsorbing metal integrally bonded and embedded in one of its two major surfaces and a cathode comprising at least one gas adsorbing metal integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

2. A gaseous fuel battery containing in combination at least a pair of adjoining fuel cells, each of said cells comprising a hydrated, ion exchange resin membrane, said membrane having an anode comprising at least one metal of the group VIII series of metals integrally bonded and embedded in one of its two major surfaces and a cathode comprising at least one metal of the group VIII series of metals integrally bonded and embedded in the other major surface, means for supplying a fuel gas to the anode of each cell of said battery, means for supplying an oxidant gas to the cathode of each cell of said battery and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

3. A gaseous fuel battery containing in combination at least a pair of adjoining fuel cells, each of said cells comprising a hydrated, ion exchange resin membrane, said membrane having an anode comprising at least one noble metal of the group VIII series of metals integrally bonded and embedded in one of its two major surfaces and a cathode comprising at least one noble metal of the group VIII series of metals integrally bonded and embedded in the other major surface, means for supplying a fuel gas to the anode of each cell of said battery, means for supplying an oxidant gas to the cathode of each cell of said battery and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

4. A gaseous fuel battery containing in combination at least a pair of adjoining fuel cells, each of said cells comprising a hydrated, ion exchange resin membrane, said membrane having an anode comprising at least one noble metal of the group VIII series of metals integrally bonded and embedded in one of its two major surfaces, said noble metal being deposited on an activated, electrically conductive carbon and a cathode comprising at least one noble metal of the group VIII series of metals integrally bonded and embedded in the other major surface, said noble metal being deposited on an activated, electrically conductive carbon, means for supplying a fuel gas to the anode of each cell of said battery, means for supplying an oxidant gas to the cathode of each cell of said battery and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

5. A gaseous fuel battery containing in combination at least a pair of adjoining fuel cells, each of said cells comprising a hydrated, ion exchange resin membrane, said membrane having an anode comprising platinum metal integrally bonded and embedded in one of its two major surfaces and a cathode comprising platinum metal integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

6. A gaseous fuel battery containing in combination at least a pair of adjoining fuel cells, each of said cells comprising a hydrated ion exchange resin membrane, said membrane having an anode comprising platinum metal powder having a surface area of at least ten square meters per gram integrally bonded and embedded in one of its two major surfaces and a cathode comprising platinum metal powder having a surface area of at least ten square meters per gram integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

7. A gaseous fuel battery containing in combination at least a pair of adjoining fuel cells, each of said cells comprising a hydrated, ion exchange resin membrane, said membrane having an anode comprising palladium metal integrally bonded and embedded in one of its two major surfaces and a cathode comprising palladium metal integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

8. A gaseous fuel battery containing in combination at least a pair of adjoining fuel cells, each of said cells comprising a hydrated ion exchange resin membrane, said membrane having an anode comprising finely divided palladium metal having a surface area of at least ten square meters per gram integrally bonded and embedded in one its two major surfaces and a cathode comprising finely divided palladium metal having a surface area of at least ten square meters per gram integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

9. A gaseous fuel battery containing in combination at least a pair of adjoining fuel cells, each of said cells comprising a hydrated, ion exchange resin membrane in which a hydrogen ion is the mobile ion, said membrane having an anode comprising at least one gas adsorbing metal integrally bonded and embedded in one of its two major surfaces and a cathode comprising at least one gas adsorbing metal integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid membrane having projections from each of its two major surfaces, the projections from one surface making direct contact with the anode of one cell and the projections from the other major surface making direct contact with the cathode of the adjoining cell.

10. A gaseous fuel battery containing in combination at least a pair of adjoining fuel cells, each of said cells comprising a hydrated, ion exchange resin membrane in which a hydroxide ion is the mobile ion, said membrane having an anode comprising at least one gas absorbing metal integrally bonded and embedded in one of its two major surfaces and a cathode comprising at least one gas absorbing metal integrally bonded and embedded in the other major surface, means for supplying a fuel gas to the anode of each cell of said battery, means for supplying an oxidant gas to the cathode of each cell of said battery, and an electrically conductive, bipolar electrode grid member common to said pair of adjoining cells, said grid member being a barrier separating the fuel gas of one cell from the oxidant gas of the adjoining cell, said grid member having projections from each of its two major surfaces, the projections from one surface making direct contact with the anode of one cell and the projections from the other major surface making direct contact with the cathode of the adjoining cell.

11. A gaseous fuel battery containing in combination at least a pair of adjoining fuel cells, each of said cells comprising a hydrated, ion exchange resin membrane, said membrane having an anode comprising at least one gas adsorbing metal integrally bonded and embedded in one of its two major surfaces and a cathode comprising at least one gas adsorbing metal integrally bonded and embedded in the other major surface, means for supplying hydrogen to the anode of each cell of said battery, means for supplying an oxidant gas to the cathode of each cell of said battery, and an electrically conductive, bipolar electrode grid member common to said pair of adjoining cells, said grid member being a barrier separating the hydrogen of one cell from the oxidant gas of the adjoining cell, said grid member having projections from each of its two major surfaces, the projections from one surface making direct contact with the anode of one cell and the projections from the other major surface making direct contact with the cathode of the adjoining cell.

12. A gaseous fuel battery containing in combination at least a pair of adjoining fuel cells, each of said cells comprising a hydrated, ion exchange resin membrane, said membrane having an anode comprising at least one gas adsorbing metal integrally bonded and embedded in one of its two major surfaces and a cathode comprising at least one gas adsorbing metal integrally bonded and embedded in the other major surface, means for supplying a fuel gas to the anode of each cell of said battery, means for supplying oxygen to the cathode of each cell of said battery, and an electrically conductive, bipolar electrode grid member common to said pair of adjoining cells, said grid member being a barrier separating the fuel gas of one cell from the oxygen of the adjoining cell, said grid member having projections from each of its two major surfaces, the projections from one surface making direct contact with the anode of one cell and the projections from the other major surface making direct contact with the cathode of the adjoining cell.

13. A battery containing in combination at least a pair of adjoining fuel cells, each of said cells comprising a hydrated, ion exchange resin membrane in which the hydrogen ion is the mobile ion, said membrane having an anode comprising at least one gas adsorbing metal integrally bonded and embedded in one of its two major surfaces and a cathode comprising at least one gas adsorbing metal integrally bonded and embedded in the other major surface, means for supplying hydrogen to the anode of each cell of said battery, means for supplying oxygen to the cathode of each cell of said battery, and an electrically conductive, bipolar electrode grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

14. A battery containing in combination at least a pair of adjoining fuel cells, each of said cells comprising a hydrated, ion exchange resin membrane in which the hydrogen ion is the mobile ion, said membrane having an anode comprising at least one metal of the group VIII series of metals integrally bonded and embedded in one of its two major surfaces and a cathode comprising at least one metal of the group VIII series of metals integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

15. A battery containing in combination at least a pair of adjoining fuel cells, each of said cells comprising a hydrated, ion exchange resin membrane in which the hydrogen ion is the mobile ion, said membrane having an anode comprising at least one noble metal of the group VIII series of metals integrally bonded and embedded in one of its two major surfaces and a cathode comprising at least one noble metal of the group VIII series of metals integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

16. A battery containing in combination at least a pair of adjoining fuel cells, each of said cells comprising a hydrated, ion exchange resin membrane in which the hydrogen ion is the mobile ion, said membrane having an anode comprising at least one noble metal of the group VIII series of metals integrally bonded and embedded in one of its two major surfaces said noble metal being deposited on activated, electrically conductive carbon and a cathode comprising at least one noble metal of the group VIII series of metals integrally bonded and embedded in the other major surface, said noble metal being deposited on activated, electrically conductive carbon, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projection from each of its two major surfaces, the projections of one surface making direct contact with the anode of one cell and the projections from the other major surface making direct contact with the cathode of the adjoining cell.

17. A battery containing in combination at least a pair of adjoining fuel cells, each of said cells comprising a hydrated, ion exchange resin membrane in which the hydrogen ion is the mobile ion, said membrane having an anode comprising platinum metal integrally bonded and embedded in one of its two major surfaces and a cathode comprising platinum metal integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

18. A battery containing in combination at least a pair of adjoining fuel cells, each of said cells comprising a hydrated, ion exchange resin membrane in which the hydrogen ion is the mobile ion, said membrane having an anode comprising platinum metal powder having a surface area of at least ten square meters per gram integrally bonded and embedded in one of its two major surfaces and a cathode comprising platinum metal powder having a surface area of at least ten square meters per gram integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

19. A battery containing in combination at least a pair of adjoining fuel cells, each of said cells comprising a hydrated, ion exchange resin membrane in which the hydrogen ion is the mobile ion, said membrane having an anode comprising palladium metal integrally bonded and embedded in one of its two major surfaces and a cathode comprising palladium metal integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

20. A battery containing in combination at least a pair of adjoining fuel cells, each of said cells comprising a hydrated, ion exchange resin membrane in which the hydrogen ion is the mobile ion, said membrane having an anode comprising palladium metal powder having a surface area of at least ten square meters per gram integrally bonded and embedded in one of its two major surfaces and a cathode comprising palladium metal powder having a surface area of at least ten square meters per gram integrally bonded and embedded in the other major surface, means for supplying hydrogen to the anode of each cell of said battery, means for supplying oxygen to the cathode of each cell of said battery, and an electrically conductive, bipolar electrode grid member common to said pair of adjoining cells, said grid member being a barrier separating the hydrogen of one cell from the oxygen of the adjoining cell, said grid member having projections from each of its two major surfaces, the projections of one surface making direct contact with the anode of one cell and the projections from the other major surface making direct contact with the cathode of the adjoining cell.

21. A process for combining at least one pair of adjoining fuel cells into a fuel cell battery which comprises interposing an electrically conductive, bipolar grid member between the said pair of cells as a common barrier separating the fuel gas of one cell from the oxidant gas of the adjoining cell, making direct contact with the anode of one cell by means of electrically conductive projections from one of the two major surfaces of said grid member and making direct contact with the cathode of the adjoining cell by means of electrically conductive projections from the other major surface of said grid member, each of said fuel cells comprising a hydrated, ion exchange resin membrane, said membrane having an anode comprising at least one gas adsorbing metal integrally bonded and embedded in one of its two major surfaces and a cathode comprising at least one gas adsorbing metal integrally bonded and embedded in the other major surface.

References Cited in the file of this patent

UNITED STATES PATENTS

| | | |
|---|---|---|
| 2,070,612 | Niederreither | Feb. 16, 1937 |
| 2,913,511 | Grubb | Nov. 17, 1959 |
| 2,914,596 | Gorin et al. | Nov. 24, 1959 |
| 2,969,315 | Bacon | Jan. 24, 1961 |
| 3,012,086 | Vahldieck | Dec. 5, 1961 |

FOREIGN PATENTS

| | | |
|---|---|---|
| 680,982 | Great Britain | Oct. 15, 1952 |